(12) United States Patent
Puppo

(10) Patent No.: US 10,405,567 B2
(45) Date of Patent: Sep. 10, 2019

(54) FOOD ADDITIVE AND METHOD TO PROCESS SAME

(71) Applicant: Americo Puppo, Buenos Aires (AR)

(72) Inventor: Americo Puppo, Buenos Aires (AR)

( * ) Notice: Subject to any disclaimer, the term of this patent is extended or adjusted under 35 U.S.C. 154(b) by 0 days.

(21) Appl. No.: 15/965,629

(22) Filed: Apr. 27, 2018

(65) Prior Publication Data

US 2018/0332875 A1    Nov. 22, 2018

(30) Foreign Application Priority Data

May 17, 2017    (AR) .............................. P20170101328

(51) Int. Cl.

| | | |
|---|---|---|
| A23L 7/122 | (2016.01) | |
| A23L 7/10 | (2016.01) | |
| A23L 7/135 | (2016.01) | |
| A23P 20/18 | (2016.01) | |
| A23L 33/135 | (2016.01) | |
| A23L 33/18 | (2016.01) | |
| A23L 33/155 | (2016.01) | |
| A23L 33/15 | (2016.01) | |
| A23L 33/16 | (2016.01) | |
| A23L 33/175 | (2016.01) | |
| A23L 33/185 | (2016.01) | |

(52) U.S. Cl.
CPC .............. *A23L 7/122* (2016.08); *A23L 7/101* (2016.08); *A23L 7/135* (2016.08); *A23L 33/135* (2016.08); *A23L 33/15* (2016.08); *A23L 33/155* (2016.08); *A23L 33/16* (2016.08); *A23L 33/175* (2016.08); *A23L 33/18* (2016.08); *A23L 33/185* (2016.08); *A23P 20/18* (2016.08); *A23V 2002/00* (2013.01); *A23Y 2300/00* (2013.01)

(58) Field of Classification Search
CPC .......... A23L 7/122; A23L 7/101; A23L 7/135; A23L 33/135; A23L 33/18; A23L 33/155; A23L 33/15; A23L 33/16; A23L 33/175; A23L 33/185
USPC ........................................................ 426/61
See application file for complete search history.

(56) References Cited

U.S. PATENT DOCUMENTS 6,025,327 A  *  2/2000  Alkayali ................ C07K 14/78
                                                      435/212

OTHER PUBLICATIONS

Pei, X. et al. 2010. Food Chem. 118: 333-340 (Year: 2010).*
Saito, M. et al. J. Agric. Food Chem. 57:10477-10482 (2009) (Year: 2009).*

* cited by examiner

*Primary Examiner* — Hamid R Badr
(74) *Attorney, Agent, or Firm* — Norris McLaughlin, P.A.

(57) ABSTRACT

A food additive for improving sensory characteristics and providing nutritional value to cereals or cereal mixture with irregular surface, which consists of collagen peptides of terrestrial and marine animal origin, the composition of which is, in % by weight, from 14% to 18% essential amino acids, from 10% to 14% aspartic acid and from 18% to 22% glycine, from 23% to 27% proline and hydroxyproline, from 9% to 13% glutamic acid, from 6% to 10% arginine, and from 6% to 10% alamine, dissolved in 5% to 50% aqueous solution, which is used as a carrier for adding ingredients, to form a uniform glossy coating on the surface of cereals or cereal mixture.

6 Claims, 2 Drawing Sheets

FOOD ADDITIVE AND METHOD TO PROCESS SAME

CROSS REFERENCE TO RELATED APPLICATIONS

Not Applicable

FEDERALLY SPONSORED RESEARCH

Not Applicable

SEQUENCE LISTING OR PROGRAM

Not Applicable

REFERENCES CITED

"Estudio el Valor Nutritivo de Hojuelas de Maíz Bajo una perspectiva Interdisciplinaria de las Ciencias"—Revista Química Viva, Number 2, Aug. 11, 2012

Publication AR70067, entitled "Un aditivo funcional a partir de la fracción libre de celulas de suero de manteca o leche fermentada"

Publication AR21339, entitled "Un subproducto de cereal molido, el cual es un aditivo para incrementar las fibras totales de la dieta".

U.S. Pat. No. 5,534,275, entitled "Alimento que contiene un ingrediente de ceral y EDTA férrico."

FIELD OF APPLICATION

The field of application of the present invention relates to foodstuffs for human consumption, in particular to the incorporation of additives into products composed of cereals or a mixture of cereals with improvements in sensory and nutritional properties.

STATE OF THE ART

Cereals, or mixture of cereals, are important as a source of energy. According to Lic. Perez Francisco, Chacon Yaneth, Torres Robin, and others in the paper "Estudio el Valor Nutritivo de Hojuelas de Maiz Bajo una perspectiva Interdisciplinaria de las Ciencias" (1) Revista Química Viva, Number 2, Year 11 Aug. 2012, which refers to corn and its chemical nature in general, corn is a cereal that together with wheat and rice make up the top three cereals consumed globally, being an important source of energy.

Its diversity of uses and presentations is varied, being found in oils, vegetables, flours and butter, among other products. This diversity derives from the set of properties that this cereal has in its structure, being able to be source of fats, starches, and flour, among others. Corn is a cereal that is constituted mainly by three fundamental parts; in the outer part it has a thin, fine and fibrous cuticle that protects the grain, called pericarp, which represents 6% of the weight of the grain, another important region is the germ, also called embryo, which is positioned in the basal and ventral part of the con, which is characterized by its richness in oils, proteins and minerals, it comprises from 9% to 12% of the total cereal, and finally the endosperm, also known as albumen, which is characterized by being the starchy section of the grain and represents most of the corn structure, approximately between 80% and 85%. Cells present in the endosperm are filled with starch granules, which are embedded in a matrix of proteins, which is why the endosperm is the main source of proteins and starches.

The chemical nature of corn is diverse, in fact there are multiple components in various concentrations and percentages; corn has a high level of starch, reaching an average of 70% to 73%, reason why this cereal is considered an important source of energy; another component of the chemical nature of corn is proteins, being located mainly in the endosperm representing between 8% and 11%.

Fatty acids are also substances that are present in this cereal and represent between 3% and 18% of the weight of the grain, being mainly polysaturated, while the monosaturated ones are found in a lower proportion.

The need for mass consumption and food preservation has led to corn applications being diversified at agro-industry level, where scientific knowledge and great technological advances have made it possible to develop diverse products based on this cereal as, such as butter, oil, and flour, among others.

Corn flakes have a global application, this is because American societies have developed technologies and applications in order to satisfy food and social needs, corn flakes are included therein.

Flakes are defined as the product of brittle and crackling texture, obtained from peeled and degerminated corn grains that have been subjected to processes of cooking, drying, rolling and baking with or without the addition of sugar, malt or edible salt (9). These corn flakes are developed with the endosperm, region with greater weight percentage and proteins, but with smaller percentage in fats. This corn also known as degerminated is one obtained with the aid of a milling that extracts the germ rich in fatty acids in addition to the pericarp.

The use and consumption of corn flakes has been diversified and modernized in order to satisfy all possible markets, in fact in the field of food technology, corn flakes have undergone various addition treatments, incorporating vitamins, minerals, sweeteners and syrups, in order to make their consumption more satisfactory.

The most important companies that sell extruded or rolled cereals in the world are: Kellogs from US, Quaker, and Arcor from Argentina.

At present, "sugar-coated corn flakes" are known in the state of the art, which are fortified with vitamins, iron and zinc, and contain 8 vitamins, 2 minerals and folic acid. Sugar-coated corn flakes are foods with added vitamins A, C, D, B1, B2, B3, B6, B12, folic acid, and iron and zinc minerals.

This product is for being mixed with milk, yogurt, and other dairy products.

In the following table we will analyze its values of Kcal, saturated fats, sodium, and fiber.

| Product/Food | Serving size | Kcal | Saturated fats | Sodium | Fiber |
|---|---|---|---|---|---|
| Sugar-coated corn flakes with added vitamins, folic acid and minerals | 30 g | 108 | 0.00 g | 204 mg | 0.9 g |

Nutrition facts are as follows:

| Nutrition facts<br>Serving size: 30 g (1 cup)<br>Servings per package: 6<br>Amounts per serving | |
| --- | --- |
| | % Daily Value* |
| Energy value 108 kcal | 5% |
| Carbohydrates 24 g | 8% |
| from which | |
| Sugars 2.4 g | |
| Starch 22 g | |
| Proteins 2.1 g | 3% |
| Total fats 0 g | 0% |
| from which | |
| Saturated fats 0 g | |
| Monoinsaturated fats 0 g | |
| Polyinsaturated fats 0 g | |
| Transgenic fats 0 g | |
| Cholesterol 0 g | |
| Fiber 0.9 g | 4% |
| Sodium 204 mg | 9% |
| Vitamin A 120 μg | 20% |
| Vitamin C 9 mg | 20% |
| Thiamine (B1) 0.24 mg | 20% |
| Riboflavin (B2) 0.26 mg | 20% |
| Niacin (B3) 3.3 mg | 21% |
| Pyridoxine (B6) 0.26 mg | 20% |
| Folic acid (B9) 48 μg | 12% |
| Cyanocobalamin (B12) 0.48 μg | 20% |
| Iron 3 mg | 21% |
| Zinc 1.5 mg | 21% |

*% Daily Values based on a diet of 2000 kcal or 8400 kJ. Your daily values may be higher or lower depending on your energy needs The following is observed in this product:
Its nutritional properties could be improved.
It does not allow to add ingredients that should not undergo thermal treatments.
It contains sugar involving health disadvantages.
  Its process does not allow variation of % of addition of ingredients.
  The appearance of the product is unattractive, since it is opaque, and it does not bring out colors.

As for the additives that are added to cereals, we can mention:

Publication AR70067, entitled "Un aditivo funcional a partir de la fracción libre de cpelulas de suero de manteca o leche fermentada", which is added to cereal bars, cookies, and others.

Publication AR21339, entitled "Un subproducto de cereal molido, el cual es un aditivo para incrementar las fibras totales de la dieta".

U.S. Pat. No. 5,534,275, entitled "Alimento que contiene un ingrediente de ceral y EDTA férrico." The invention provides a cereal product fortified with ferric EDTA as a source of iron. It also discusses a method to prevent or treat iron deficiency anemia.

As for sugar content, the recommendation is to consume less amount thereof, so Steven E. Nissen, president of cardiovascular medicine at Cleveland Clinic Foundation, recommends that young people try to avoid excess sugar because excessive sugar consumption is linked to obesity and diabetes.

OBJECT OF THE INVENTION

The object of the invention is a food additive comprising collagen peptides of animal origin dissolved in an aqueous solution, and optionally natural peptides of vegetable origin dissolved in an aqueous solution are added, which is used as a carrier for other ingredients.

They are applied on the cereals or cereal mixture, form a coating extrinsic to them, which gives them important characteristics such as:
  High nutritional value compared to known products.
  It allows the use of different particle sizes, which will be reflected in brightness, elasticity, and permeability to water vapor.
  It allows the addition of ingredients that should not undergo thermal treatments.
  It gives to its surface brightness and it bring out its appearance, and its coloration.

This coating enables cooperative functionalities between peptides and ingredients. The coating is achieved by dosing collagen peptides of animal origin, dissolved in an aqueous medium, and optionally incorporating ingredients, and applying them to the cereal mixture by means of a fine spray or atomization, then drying them, rolling them and repeating the operation, achieving a uniform coverage on the cereal mixture.

The number of layers may be increased by repeating the above spraying or atomizing operation, and by rolling the cereal mixture.

The amount of peptides and ingredients applied to the cereals by spraying is regulated according to the nutritional contribution (various amino acids) required, which gives the process the "Versatile" characteristic.

The foregoing is achieved through the fulfillment of the different steps of the "Procurement Process", which can be continuous, or also by batch.

When applying the food additive on cereals:
  It improves nutritional properties by aggregating peptides
  The composition of peptides allows to obtain a multicomponent coating on the surface of cereals that allow cooperative functionalities. That is how the peptide mixture is used as a carrier for other ingredients which increase intrinsic properties of coating, such as its antioxidant capacity, and its moisture barrier, furthermore it carries active molecules such as probiotics.
  It does not incorporate sugar, since it is replaced by non-caloric sweeteners.
  Brightness is obtained on its surface, which constitutes an improvement in the visual sensorial appearance, which as a result would favor its consumption.

Regarding the "Procurement Process":
  The application of peptides on cereals forms a coating that makes it possible to add products that should not undergo heat treatment due to their instability when exposed to it.
  It is a "Versatile Process" since the amount of peptides applied by spraying is regulated, according to the nutritional contribution in diverse amino acids being required.

The peptide composition acts as a carrier for incorporating ingredients and allows multiple percentages of addition thereof.
  It allows the use of different compositions of peptides accompanied with different ingredients.
  It will be possible to apply from 1 to n layers of peptides with ingredients.

BRIEF DESCRIPTION OF DRAWINGS

In order to make the object of the invention more intelligible, it has been illustrated with schematic figures, in one of its preferred embodiments, which assume a character of demonstrative and non-limiting example.

DETAILED DESCRIPTION OF THE INVENTION

Figure 1:
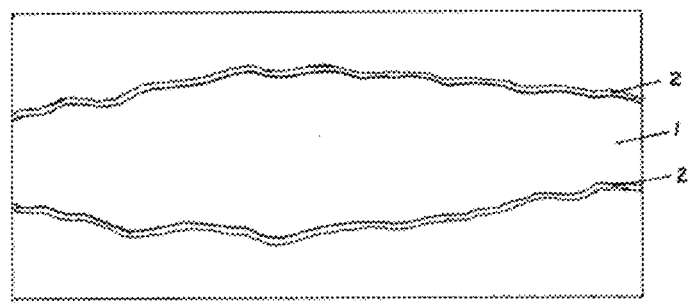
FIG. 1. View through a magnifying glass, in which the coating composed of a single layer is observed on the cereal, namely:
1.—Extruded or rolled cereal
2.—Coating composed of a single layer of collagen peptides of animal origin and ingredients.
Figure 2:
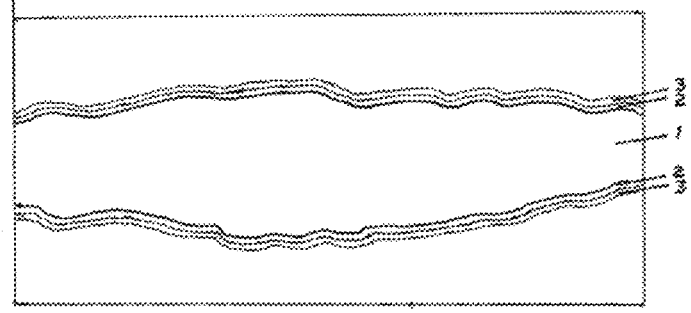
FIG. 2. View through a magnifying glass, in which the coating with two layers is observed on the cereal:
1.—Extruded or rolled cereal
2 and 3.—Coating composed of two layers of collagen peptides of animal origin and ingredients.
Figure 3:
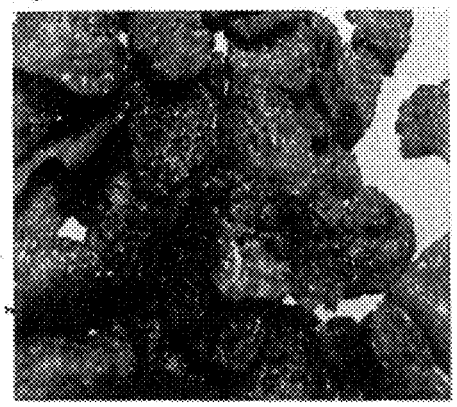
FIG. 3 and FIG. 4. Cereals with uniform coating are observed, where brightness on the surface and colors enhancement stand out.
Figure 4:
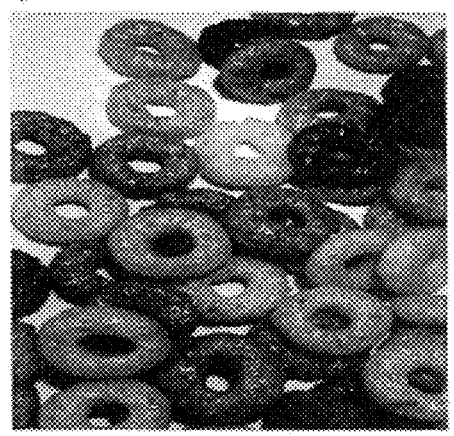

The present innovation is an additive that can be defined as molecules having three-dimensional structure and a molecular weight defined between a certain scope categorized as collagen "peptides" of animal origin that, by being dissolved in aqueous medium and being applied on a mixture of cereals extruded or rolled like corn flakes, and subsequently dried, they provide to extruded products or rolled grain with non-smooth surfaces, the feature of conferring brightness and enhancement to their appearance and coloration, which has not been achieved until now. It can be a typical feature or one added with dyes, not being yet achieved.

They do not confer any flavor, there are cases in which sugar syrups are applied, which can give brightness and give sugar sweetness factor as well as properties provided by sugar that nutritional recommendations try to limit it in available products.

In this innovation the characteristics of the improvement in the visual sensorial aspect, is "the beginning" of a set of contributions of unique nutritional properties and the possibility of combination with other ingredients as carriers because of their amicable physicochemical feature to obtain various improvements in aspects aforementioned.

There are ways to add peptides in the formulation of a food on an intrinsic basis, however, this innovation of adding it as a coating or extrinsic form allows to add products that should not be subjected to heat treatment because of its instability when exposed to it, as it is the case of heat treatment subjected to extruded cereal mixtures. As an example, we refer to probiotics and to certain vitamins such as ascorbic acid or vitamin c.

Logically, trying to add peptides to a cereal mixture to be extruded would denature peptides and cause them to lose their valuable biofunctionality mentioned above.

It should be noted that in products that are governed by the Kosher or Halal standard, hydrolyzed fish collagen peptides and/or peptides of vegetable origin are only used in the formulation.

Next, we will analyze in detail each component of the product, and steps of the process.
1.—with Regard to Cereals:
It is summarized in the following table

|  | IN PARTICULAR | PROPERTIES |
|---|---|---|
| Extruded or rolled cereals | Con flake type | Important source of energy. Source of oils, proteins and minerals. High level of starch. |

2.—with Regard to Coating:
It is based on using an edible biomaterial for the coating with the possibility of forming a coating capable of offering different physical and chemical properties.

Materials to be used are mainly collagen peptides of terrestrial and marine animal origin, having a certain molecular weight and peptides of vegetable origin.

The use of said peptides, and their outer application as a coating, is carried out in extruded cereal-based products whose surface is not uniform.

They dissolve in an aqueous solution between 5 and 40% (with a natural preservative produced as a metabolite of lactic fermentations in the order of 0.1%)

These peptides, recommended as "products being safe according to United States FDA" increase the nutritional value of the amino acid composition, and due to benefits that peptides can bring to health, being all duly recorded in relevant studies.

The peptide base described is used as a carrier for other ingredients that may increase intrinsic properties of the coating being achieved, by improving its antioxidant capacity, as well as its moisture barrier, carrying active molecules such as probiotics of bifidobacteria type, wherein due to the dissolution system and application of this method the latter do not undergo thermal aggression, which would reduce its final effectiveness, possibility of incorporating vitamins, minerals, fibers, coloring, flavors, active components with specific antimicrobial effects, (e.g. incorporation of lysine which inhibits *listeria monocytogenes*), incorporation of powdered fruits and vegetables, soluble concentrated extracts, application of non-caloric sweeteners and suitable for stevioside-type diabetics in corn flakes type products, not incorporating sugar.

Properties of these peptides are excellent for said coating, since the distribution of polar and non-polar charges of amino acids along the peptide chain creates chemical potential.

The result of interactive (polar and non-polar) forces produces a cohesive matrix of the peptide coating.

The coating shape is stabilized through electrostatic interactions, hydrogen link, Van der Walls forces, covalent bonding and disulfide link.

Due to the multiple sites they have for chemical interaction depending on the various amino acids and their functional groups, they allow cross-linking between chemical bonds (known as Cross-linked) and cause these coatings to be more stable and have a longer life than others, for example those obtained by polysaccharides. The cross-linking of chemical bonds (Cross-linked) between peptides increases the barrier to moisture, this can also be enhanced by the addition of some organic acid (lactic type), as well as cross-linking of chemical linkages (Cross-linked) may be increased by interaction with polysaccharides or complex formation between peptides and polysaccharides, which improve coating characteristics in terms of moisture barrier and mechanical strength.

The basic composition of the aforementioned peptides allows, because of the aforementioned attributes, to incorporate other ingredients which improve the initial properties such as the addition of a plasticizer such as sorbitol or mannitol, to develop extensivity and viscoelasticity and the addition of soluble fibers to increase the strength of the coating.

Due to hydrophilic nature of peptides, coatings achieved provide an excellent oxygen barrier, which can be enhanced by the incorporation of a lipid component using a suitable surfactant, such as modified lecithins.

As it can be seen, this peptide composition can be used in a multicomponent coating for diverse utilities, since it allows for cooperative functions. The three-dimensional characteristic of these polymers makes them easily modifiable in order to develop physicochemical properties for coating applications. In the peptidic composition which we are referring to, we can also use various particle sizes or, to be precise, molecular sizes, as the particle size is smaller, an increase in the brightening, elasticity property, and a decrease of permeability to water vapor can be achieved.

The proposed additive has a molecule size between 2000 and 4000 molecular weight (definition of molecular weight: it is the sum of the weight of all the atoms present in a molecule).

The ones applied on cereals or cereal mixture have an effect of improvement in the sensorial quality related to the appearance, which is reflected in the brightness of these products and in the enhancement of colors, effects that have not been seen until now in domestic and international market products.

In the following table the properties of the mentioned peptides are observed.

|  | IN PARTICULAR | PROPERTIES |
| --- | --- | --- |
| Natural peptides of animal origin | Terrestrial or marine animals. Fish collagen | The mixture of peptides of vegetable and animal origin: It gives the final product high nutritional value due to the composition of amino acids. It improves nutritional properties Carrier of other ingredients It is used as a moisture barrier Carrier of active molecules (they are bifidobacteria-type probiotics) Mechanical strength of coating Enables the addition of a plasticizer |
| According to nutritional needs, natural peptides of vegetable origin are optionally incorporated. | Chickpea peptides | See above |

In relation to some properties contributed by these peptides: Due to their nutritional value and their effects on human health, peptides are one of the ingredients that are most taken into account because of their increasingly studied properties connected to human health.

To mention some, they have high bioavailability which guarantees their bioactivity, studies show that peptides are highly digestible and are bio-available at a 90%. They are 100% natural and safe, clinical evidence shows their clear functional benefits, and that they do not have side effects.

About collagen peptides of animal origin, there are vast studies on the improvement of skin health as well as health of bones and joints, antihypertensive properties of fish peptides. In these Type 1 collagen peptides, the collagen commonly found in bones and human skin is characterized by a unique combination of 18 key amino acids that provide biofunctional properties that can not be found in another source of proteins.

On the other hand the bioactivity contributed by peptides of vegetable origin is reflected in several beneficial activities on the human organism depending on their origin, namely: hypercholesterolemiant action, antioxidant action, antimicrobial action, immunomodulatory action, and anti-inflammatory action.

In the case of peptides derived from the hydrolysis of pig collagen, their anti-hypercholesterolemia effect has been proven due to the competition of bioactive peptides, decreasing the micellar solubility of cholesterol, avoiding their absorption and passage into the bloodstream.

3.—Regarding the "Stage of Application of Coating" Mentioned in the Obtaining Process:

It consists of spraying a solution of peptides in an aqueous medium with drying by hot air.

In order to achieve a uniform (even) coating, a fine spray or atomization will be performed on the product that is rolling in a suitable chamber in proportions with intermittent sprays being intercalated with hot air flow to produce their drying, this operation can be carried out as many times as necessary to incorporate the desired amount of product according to the purposes described above, as well as different compositions of the peptide solution blended with different components to produce multilayers with various incorporated ingredients, logically based on the properties of peptides of the base composition.

There are multiple variants that can be adjusted for each particular product and for each process, generating a continuous system instead of a batch system as described above, and different ways of using hot air flow for drying.

4.—With Regard to Ingredients

The following table show the ingredients and their properties

| INGREDIENTS | IN PARTICULAR | PROPERTIES |
| --- | --- | --- |
| Flavors | Instable at temperature, very volatile | By incorporating them into the peptide matrix, it is possible to apply them without deterioration or loss of flavoring effect |
| Vitamins | Vitamin C | Antioxidant |
| Minerals | Selenium | Promotes cell anti-aging |
| Soluble fibers | Inulin | Increases the strength of the coating, probiotics |
| Colorants | Lutein, lycopene | Promote the health of the retina, promote the health of the prostate Inhibits |
| Lysine | Lysine | Inhibit listeria monocytogenes |
| Fruits and vegetables powder | Cranberry powder | Promotes the health of the retina |
| Concentrated soluble extracts | *Aloe* Extract | Stimulates the production of intestinal bacterial flora, reduces irritations, heals wounds, and helps assists ulcers. |
| Non-caloric sweetener | Stevia | Not caloric. Avoid obesity and diabetes |
| Further: | | |
| Lactic acid | Lactic acid | Prevents the proliferation of fungi |
| Polysaccharides | Polydextrose | Produce a structural cohesion that provides a support matrix, increase the mechanical strength of the film |
| Plasticizer | Sorbitol or mannitol | Develops extensivity and viscoelasticity of coating |
| Surfactant | Modified Lecithins | Emulsifier |
| Lipid component | Phospholipids | Contribute to the hydrorepulsion of the coating, improve the barrier to moisture |

When applying collagen peptides dissolved in an aqueous solution on cereals or cereal mixture you get gloss on their surface.

We note in the following table that in the case of the proposed product, it is much greater compared to products known in the market.

| PRODUCT | Brightness | Measurement |
|---|---|---|
| Known in the market: cereals containing sugar | Opaque | Simple visual appreciation |
| Known in the market: Extruded cereal spheres bearing chocolate flavor, various brands | Opaque | Simple visual appreciation |
| Proposed: food additive applied on cereals or cereal mixture, with a molecule size corresponding to a range of 2000 and 4000 molecular weight | Gloss | Simple visual appreciation |

5.—Characteristics of the Food Additive, and the Process of Obtaining Thereof

Food additive for improving sensory characteristics and providing nutritional value to cereals or cereal mixture with irregular surface, which consists of collagen peptides of terrestrial and marine animal origin, the composition of which is, in % by weight, from 14% to 18% essential amino acids, from 10% to 14% aspartic acid and serine, from 18% to 22% % glycine, 23% to 27% proline and hydroxyproline, from 9% to 13% glutamic acid, from 6% to 10% arginine, and from 6% to 10% alamine, dissolved in 5% to 50% aqueous solution, which is used as a carrier for adding ingredients, including those which should not undergo heat treatments, which is applied to the surface of cereals or cereal mixture (1) forming a uniform and glossy coating (2), which increases their nutritional value, and enhances colors.

In particular, collagen peptides of terrestrial and marine animal origin, the composition of which in % by weight is 16% essential amino acids, 12% aspartic acid and serine, 20% glycine, 25% proline and hydroxyproline, 11% glutamic acid, 8% arginine, and 8% alamine, dissolved in 5% to 50% aqueous solution, which is used as carrier to form a uniform glossy coating (2) on the surface of the cereals or mixture of cereals (1).

The coating (2) is composed of 1 to n layers, the greater the number of layers, the nutritional value increases.

Collagen peptides dissolved in aqueous solution are applied extrinsically on cereals.

It optionally contains peptides of vegetable origin, these are chickpea peptides. Collagen peptides dissolved in an aqueous solution provide 4 calories per gram. Collagen peptides dissolved in an aqueous solution applied to cereals do not confer any flavor to them, they act as a barrier to moisture, they are carriers of active molecules, and they are bifidobacteria-type probiotics.

Collagen peptides dissolved in an aqueous solution give mechanical strength to the coating, they allow the addition of soluble fibers. Collagen peptides dissolved in an aqueous solution allow the use of various sizes of molecules, at smaller molecular size of peptides, an increase in brightness is achieved, and colors are enhanced.

At lower molecular size of peptides, an increase in elasticity is achieved, permeability to water vapor decreases.

The amount of collagen peptides dissolved in aqueous solution may vary according to the nutritional contribution being required.

The following ingredients are optionally added: vitamin C, minerals: selenium, soluble fibers: inulin, colorants: lutein, lycopene, lysine, fruits and vegetables powder: cranberry powder, soluble concentrated extracts: aloe extract, and sweetener such as *stevia*. In addition lactic acid, polysaccharides: polydextrose, a plasticizer: sorbitol or mannitol, a surfactant: modified lecithins, and a lipid component: phospholipids are added.

Incorporated ingredients improve antioxidant capacity.

Cereals are extruded or rolled into corn flakes of non-smooth surface (1)

The "Process for obtaining the food additive for improving sensory characteristics and providing nutritional value to cereals or cereal mixture with irregular surface, consists of the following steps:

a.—Providing and storing collagen peptides of animal origin, such as fish collagen peptides or pig collagen peptides whose composition, in % by weight, is from 14% to 18% essential amino acids, from 10% to 14% % aspartic acid and serine, from 18% to 22% glycine, from 23% to 27% proline and hydroxyproline, from 9% to 13% glutamic acid, from 6% to 10% arginine and from 6% to 10% alamine, b.—Dosing collagen peptides, c.—Optionally incorporating, according to the nutritional needs, natural peptides of vegetable origin, such as chickpea peptides.

d.—Dosing collagen peptides, e.—Optionally mixing collagen peptides of animal origin with natural peptides of vegetable origin, f.—Dissolving in 5% to 50% aqueous solution, g.—Adding a natural preservative produced as a lactic fermentation metabolite in the order of 0.1% and dissolving with agitation, h.—Optionally incorporating ingredients, according to nutritional requirements, i.—Incorporating the ingredients to the peptide mixture and dosing them: Vitamins, minerals, soluble fibers, dyes and flavors, lysine, fruits and vegetables power, soluble concentrated extracts, non-caloric sweeteners such as *stevia*, lactic acid, polysaccharides, a plasticizer such as sorbitol or mannitol, a surfactant, a lipid component, and j.—Obtaining the additive.

The composition of collagen peptides of animal origin, such as fish collagen peptides or pig collagen peptides, consists, in % by weight, of: 16% essential amino acids, 12% aspartic acid and serine, 20% glycine, 25% % proline and hydroxyproline, 11% glutamic acid, 8% arginine, and 8% alamine.

The process is continuous according to step a) to step j) or by batch. Process for obtaining cereals or mixtures of cereals coated with the food additive consisting of the following steps:

a. Providing the cereals or cereal mixture to be coated with the aqueous solution containing the additive consisting of from 14% to 18% essential amino acids, from 10% to 14% aspartic acid and serine, from 18% to 22% glycine, from 23% to 27% proline and hydroxyproline, from 9% to 13% glutamic acid, from 6% to 10% arginine, and from 6% to 10% alamine, dissolved in 5% to 50% aqueous solution, b.—fixing the number of layers that will constitute the coating according to the required nutritional value, c.—coating the cereals with the solution (from step a), by means of an application by fine spray or atomization, d.—drying by means of a stream of air at a temperature of 80° C., e. rolling the cereal mixture to expose the rest of the surface to a new application by fine spray or atomization, f.—repeating the operation of fine spray or atomization, drying and rolling to provide greater nutritive value and gloss over the surface of cereals or cereal mixture by forming a coating composed of 1 to n layers, and g.—obtaining cereals coated with the additive.

Example of Embodiment

An exemplary embodiment that is not limiting will now be developed. It began with a nutritional requirement in which it was necessary to improve the nutritional contribution through the consumption of cereals.

This is how it was necessary to increase protein and ingredients by 50%, and to a greater extent vitamins and minerals.

A coating was applied on the surface of cereals already fortified with 8 vitamins and 2 minerals.

The coating was composed of collagen peptides of animal origin, whose composition was 16% essential amino acids, 12% aspartic acid and serine, 20% glycine, 25% proline and hydroxyproline, 11% glutamic acid, 8% arginine, and 8% alamine, dissolved in 5% to 50% aqueous solution.

The interest was based on the increase of proteins, since they are fundamental for the nutrition and necessary to achieve the desired brightness on the surface of cereals.

A coating was applied to cereals by spraying, then they were dried with hot air at 80° C., they were rolled, and the foregoing was repeated successively, forming layers on their surface.

30 g. of cereals (cited in the table on page 4) were applied, wherein a dose of 3 g of peptide solution at 34% by weight or a dose of 6 g of peptide solution at 17% by weight or a dose between the mentioned ranges maintaining the same proportion, has 2, 1 g. of proteins, incorporating a gram of proteins representing a 50% increase in the protein value, thus fulfilling the proposed objective.

Evaluation of Response

The analysis of samples of 30 g (1 cup) showed that proteins increased by 50%, i.e. from 3% to a value of 4.5%.

Said mixture of peptides dissolved in an aqueous solution was used as carrier for adding ingredients, which were increased by 50%. This is as follows:

Thiamine changed from 20% to 30%
Riboflavin changed from 20% to 30%
Niacin changed from 21% to 30.5%
Pirodixin changed from 20% to 30%
While Vitamin A, Vitamin C as well as minerals increased by more than 50%.

CONCLUSIONS

It was concluded that it satisfactorily met the requirements

What I claim is:

1. A process for producing a food additive comprising the following steps in order:
    a) providing type I collagen peptides of animal origin whose composition, in % by weight of the food additive, is from 14% to 18% essential amino acids, from 10% to 14% of a mixture of aspartic acid and serine, from 18% to 22% glycine, from 23% to 27% of a mixture of proline and hydroxyproline, from 9% to 13% glutamic acid, from 6% to 10% arginine, and from 6% to 10% alanine,
    b) optionally incorporating natural peptides of vegetable origin,
    c) dissolving the type I collagen peptides of animal origin and optionally the collagen peptides of vegetable origin to form a 5% to 50% aqueous solution,
    d) adding to the aqueous solution a natural preservative produced as a lactic fermentation metabolite and dissolving the natural preservative with agitation to form a second solution, and
    e) incorporating into the second solution components selected from the group consisting of a mineral, soluble fiber, a dye, a flavor, lysine, powdered fruit, powdered vegetable, a soluble concentrated extract, a non-caloric sweetener, *stevia*, lactic acid, a polysaccharide, a plasticizer, sorbitol, mannitol, a surfactant, and a lipid, or mixtures thereof, thereby obtaining the additive.

2. The process according to claim 1, wherein the composition of type I collagen peptides of animal origin comprises, in % by weight of the food additive, about 16% of essential amino acids, about 12% of the mixture of aspartic acid and serine, about 20% glycine, about 25% of the mixture of proline and hydroxyproline, about 11% glutamic acid, about 8% arginine, and about 8% alanine.

3. The process according to claim 1, wherein the process is performed continuously.

4. The process according to claim 1, wherein the process is performed by batch.

5. The process according to claim 1, wherein the type I collagen peptides of animal origin are fish collagen peptides or pig collagen peptides.

6. The process of claim 1, wherein the natural peptides of vegetable origin are chickpea peptides.

\* \* \* \* \*